US011915507B2

(12) United States Patent
Suwald

(10) Patent No.: US 11,915,507 B2
(45) Date of Patent: Feb. 27, 2024

(54) LOCATION- AND IDENTITY-REFERENCED AUTHENTICATION METHOD AND COMMUNICATION SYSTEM

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 467 days.

(21) Appl. No.: 16/685,206

(22) Filed: Nov. 15, 2019

(65) Prior Publication Data

US 2020/0167539 A1   May 28, 2020

(30) Foreign Application Priority Data

Nov. 28, 2018  (EP) ..................... 18208820

(51) Int. Cl.
| | | |
|---|---|---|
| *G06F 21/35* | (2013.01) | |
| *G06V 40/13* | (2022.01) | |
| *G06Q 20/40* | (2012.01) | |
| *H04L 9/40* | (2022.01) | |
| *H04W 12/069* | (2021.01) | |
| *G06F 21/32* | (2013.01) | |

(52) U.S. Cl.
CPC .......... *G06V 40/1306* (2022.01); *G06F 21/32* (2013.01); *G06F 21/35* (2013.01); *G06Q 20/40* (2013.01); *G06V 40/1329* (2022.01); *H04L 63/18* (2013.01); *H04W 12/069* (2021.01); *G06F 2221/2111* (2013.01)

(58) Field of Classification Search
CPC .. G06F 21/32; G06F 21/35; G06F 2221/2111; H04L 63/18
See application file for complete search history.

(56) References Cited

U.S. PATENT DOCUMENTS

| | | | |
|---|---|---|---|
| 7,460,697 B2 | 12/2008 | Erhart et al. | |
| 7,664,476 B2 | 2/2010 | Yanagida | |
| 7,864,992 B2 | 1/2011 | Riedijk et al. | |
| 8,854,107 B2 | 10/2014 | Kwon et al. | |
| 9,310,953 B1 | 4/2016 | Maharyta | |

(Continued)

FOREIGN PATENT DOCUMENTS

| | | |
|---|---|---|
| CN | 105210073 A | 12/2015 |
| CN | 105243313 A | 1/2016 |

(Continued)

OTHER PUBLICATIONS

Notice of Allowance dated Mar. 15, 2021 for U.S. Appl. No. 16/687,955, 25 Pages.

(Continued)

*Primary Examiner* — David J Pearson

(57) ABSTRACT

A method for authenticating a first party to a second party, the method comprising: i) providing a token, wherein the token is at least a part of a mobile entity and wherein the token is coupled to a secret being indicative for the identity of the first party, ii) coupling the token with an access point by establishing a physical contact, iii) transferring the secret to the access point, iv) linking the secret with a location information of the access point, thereby providing an authentication token being indicative for the identity and the location of the first party, and v) providing the authentication token to the second party.

13 Claims, 5 Drawing Sheets

(56) References Cited

U.S. PATENT DOCUMENTS

| | | | |
|---|---|---|---|
| 9,372,582 B2 | 6/2016 | Brunet et al. | |
| 9,519,819 B2 | 12/2016 | Hansen et al. | |
| 9,785,822 B2 | 10/2017 | Lee et al. | |
| 10,205,895 B2 | 2/2019 | Lin et al. | |
| 10,627,959 B2 | 4/2020 | Jiang et al. | |
| 10,706,250 B2 | 7/2020 | Chen | |
| 2012/0116887 A1* | 5/2012 | Norair | G06Q 20/322 |
| | | | 455/41.1 |
| 2012/0137132 A1 | 5/2012 | Le Saint | |
| 2013/0198066 A1* | 8/2013 | Wall | G06Q 20/3278 |
| | | | 705/41 |
| 2014/0289116 A1* | 9/2014 | Polivanyi | G07F 19/20 |
| | | | 705/44 |
| 2015/0244699 A1 | 8/2015 | Hessler | |
| 2015/0338952 A1 | 11/2015 | Shahparnia et al. | |
| 2016/0011014 A1 | 1/2016 | Entringer et al. | |
| 2016/0379032 A1 | 12/2016 | Mo et al. | |
| 2017/0076280 A1* | 3/2017 | Castinado | H04L 63/0823 |
| 2017/0243195 A1* | 8/2017 | Xing | H04W 4/12 |
| 2018/0144170 A1 | 5/2018 | Suwald | |
| 2018/0181735 A1* | 6/2018 | Yang | G06F 21/36 |
| 2018/0218192 A1 | 8/2018 | Suwald | |
| 2018/0276652 A1* | 9/2018 | Sofronas | G06Q 20/20 |
| 2018/0330138 A1 | 11/2018 | Suwald | |
| 2018/0332036 A1* | 11/2018 | Mokhasi | H04L 9/3231 |
| 2019/0014274 A1 | 1/2019 | Lin et al. | |
| 2019/0066114 A1* | 2/2019 | Ross | G06F 21/32 |
| 2019/0089717 A1* | 3/2019 | Dolev | G06F 21/31 |
| 2019/0095926 A1* | 3/2019 | Li | G06Q 20/102 |
| 2019/0108731 A1* | 4/2019 | Hazard | G07F 19/206 |
| 2019/0196654 A1 | 6/2019 | Jiang et al. | |
| 2019/0213375 A1 | 7/2019 | Suwald et al. | |
| 2019/0286868 A1 | 9/2019 | Suwald | |
| 2020/0184175 A1 | 6/2020 | Suwald et al. | |
| 2020/0210046 A1 | 7/2020 | Lee et al. | |

FOREIGN PATENT DOCUMENTS

| | | |
|---|---|---|
| CN | 105378744 A | 3/2016 |
| CN | 107210918 A | 9/2017 |
| CN | 107408170 A | 11/2017 |
| KR | 101715630 B1 | 3/2017 |
| WO | WO-2015133773 A1 | 9/2015 |

OTHER PUBLICATIONS

Landberg, Anton et al.; "Detection and Suppression of Common-Mode Noise in Capacitive Fingerprint Sensors;" Master's Thesis; Chalmers University of Technology, Department of Computer Science and Engineering; University of Gotheburg, Sweden; 2016.

Ghogare, Shraddha D. et al., "Location Based Authentication: A New Approach Towards Providing Security;" International Journal of Scientific and Research Publications; vol. 2, No. 4, IJSRP, Gurgaon, India; Apr. 2012 Edition.

Kuseler, Torben et al., "Using Geographical Location as an Authentication Factor to Enhance mCommerce Applications on Smartphones;" International Journal of Computer Science and Security (IJCSS); Published Aug. 10, 2012; vol. 6, No. 4.

U.S. Appl. No. 16/687,955; Inventors, Thomas Suwald et al.; Title: "Apparatus and Method for Measuring a Capacitance, and a Fingerprint Sensor Utilizing the Same;" filed Nov. 19, 2019.

* cited by examiner

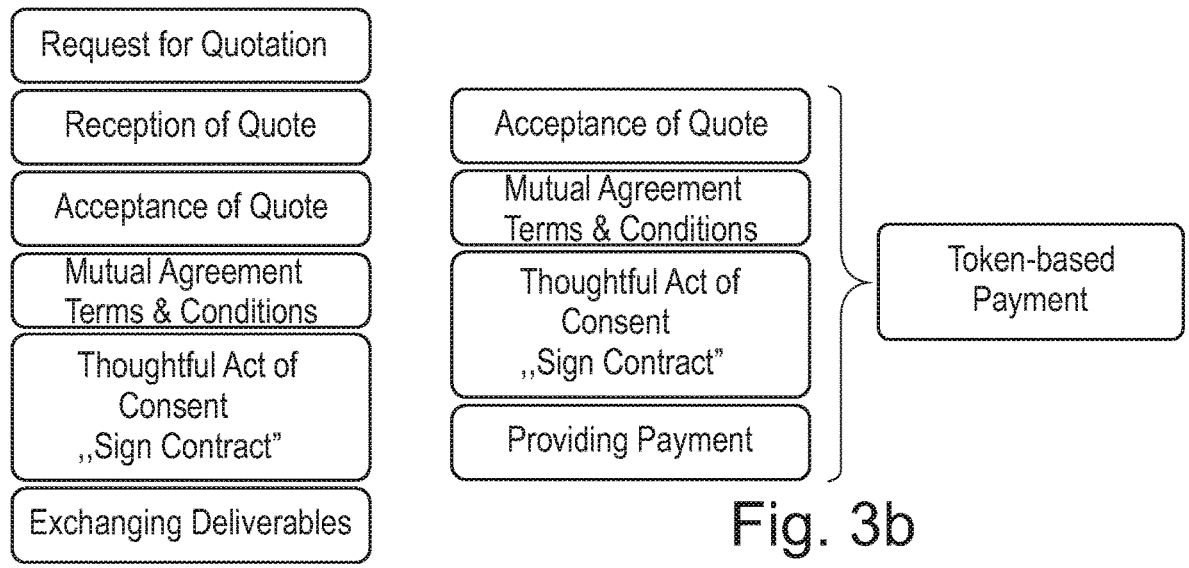
- Prior art -
Fig. 3a
Fig. 3b
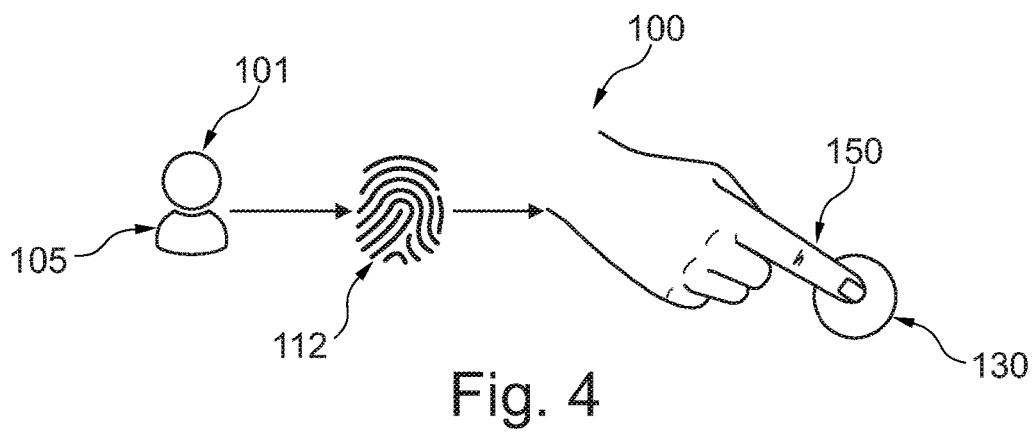
Fig. 4
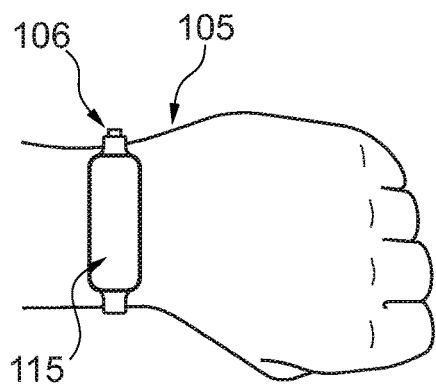
Fig. 5a
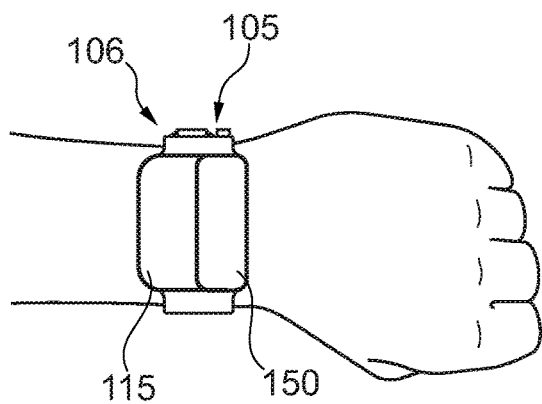
Fig. 5b

LOCATION- AND IDENTITY-REFERENCED AUTHENTICATION METHOD AND COMMUNICATION SYSTEM

CROSS-REFERENCE TO RELATED APPLICATIONS

This application claims priority under 35 U.S.C. § 119 to European Patent Application No. 18208820.3, filed on Nov. 28, 2018, the contents of which are incorporated by reference herein.

FIELD OF THE INVENTION

The invention relates to a method of authentication and a communication system.

BACKGROUND OF THE INVENTION

Service transactions such as payment transactions are commonly authenticated by a two-factor authentication comprising a smartcard and a PIN code. The service may also be linked to granting the card-holder access to e.g. a facility, a car, a vessel, a home, or an apartment. A mutual agreement between two parties may hereby form the base of the transaction.

A secure transaction may be applicable if i) the contact partners may eye-witness all steps (e.g. payment in a shop), and/or ii) exchange of deliverables may be separated in time such that payment is provided upfront and goods are delivered thereafter or vice versa.

The secure transaction may be more complex if one party shall grant identity-restricted physical access to e.g. a facility or a vehicle. If separation in time is applied, this may require to check the identity of an individual requesting access to a facility at the time of physical access first and granting access thereafter.

The secure transaction may also be complex if the type of transaction requires one party to check at the moment of the mutual agreement the identity of the other party to make sure that the agreement has been established between authentic parties. In case the agreement is to be established through a communication channel that does not provide location-reference and as such does not allow to eye-witness all steps required to execute the transaction, it cannot be safeguarded that the transaction may be executed between authentic partners.

In particular, mobile devices utilize communication channels that do not allow precise location-referencing and are thus not suitable to authenticate access to location-referenced services. Such services may e.g. be a ride on public transportation, entering a soccer match, or entering a concert. Some prior art examples may utilize one-time-tokens, that may be optically encoded certificates. These one-time-tokens may grant a single individual access to a service or an event, but may not differentiate which individual may utilize the one-time-token. Thus, individual services may not be provided.

OBJECT AND SUMMARY OF THE INVENTION

It is an object of the invention to provide a robust, secure, and individual authentication between two parties, even though a mobile entity is involved.

In order to achieve the object defined above, a method and a communication system according to the independent claims are provided.

According to an exemplary embodiment of the invention, a method for authenticating a first party to a second party is provided. The method comprising: i) providing a token (e.g. a part of a mobile phone or the finger of a human), wherein the token is at least a part of a mobile entity, wherein the token is coupled with a secret being indicative for the identity of the first party, ii) coupling the token with an access point (e.g. an interface of a point of sale) by establishing a physical contact (between the token and the access point), iii) transferring the secret to the access point, iv) linking the secret with a location information of the access point (e.g. by a processor of the access point), thereby providing an authentication token being indicative for the identity and the location of the first party, and v) (authenticating the first party by) providing the authentication token to the second party.

According to a further exemplary embodiment of the invention, a communication system is provided. The communication system comprises: i) a token, wherein the token is at least a part of a mobile entity, and wherein the token is coupled to a secret being indicative for the identity of a first party, ii) an access point, configured to be coupleable to the token by establishing a physical contact such that the secret can be transferred to the access point. The access point is coupled to a processor, wherein the processor is configured to link the secret with a location information of the access point, thereby providing an authentication token being indicative for the identity and the location of the first party. The communication system further comprising: iii) an authentication unit of the second party configured to receive the authentication token (and to authorize the first party to the second party).

In the context of the present application, the term "token" may refer to any suitable hardware or software that is part of a mobile entity and that can be coupled to a secret. Hereby, the term "mobile entity" may refer to any entity that is not immobile. Hence a mobile entity may be a mobile device such as a smart phone or a smart card, but also a living being such as a human or an animal. In an embodiment, the token may be a finger of a human. The human may hereby be the mobile entity and the secret, being indicative for the first party and being coupled to the finger, may be the fingerprint. In another embodiment, the token may be embedded in a mobile device, for example a smart phone. The smart phone may physically contact an access point, e.g. by touching it. The secret coupled to the token may hereby be a PIN code. In another embodiment, the mobile entity may be a human who carries a mobile device such as a wristwatch or smartcard. The token may be a finger of the human (not being part of the mobile device but part of the mobile entity) and/or may be embedded in the mobile device carried by the human (being part of the mobile device and part of the mobile entity).

In the context of the present application, the term "secret" may refer to any data that may be used to be indicative for a first party, e.g. a user/customer. Hence, the secret may be a PIN code or a biometric. For example, a biometric may be a fingerprint, a handwriting, a heart rate, data related to iris, retina, hand vein, or templates thereof. The secret may be delivered in the digital form of bits (e.g. an encoded fingerprint) or in analog form, e.g. a fingerprint directly measured by a fingerprint sensor. The secret may further be coupled to the token. For example, the token may be a finger and the secret may be the fingerprint of the finger. In another example, the token may be coupled to a processing unit and the secret may be stored on the processing unit (or a memory thereof). In an embodiment, the token may be a display that shows the secret (received from the processing unit) as an optical barcode or QR-code. In another embodiment, the token may be a finger that touches the access point and thereby establishes a galvanic or capacitive coupling. Thereby, a communication channel between a processing unit (e.g. in a wristwatch) and the access point may be established via the finger. The secret, in this manner coupled to the token, may be transferred from the processing unit to the access point.

In the context of the present application, the term "access point" may refer to any suitable device that may enable a physical coupling with a token as defined above. In a most basic embodiment, the access point may comprise an interface that is configured as a button comprising a sensor. When the token is a finger and the secret is the fingerprint, then the finger can press the button (thereby establishing the physical coupling) and the secret is transferred, when the sensor determines the fingerprint. In addition or alternatively, the secret may first be transferred to a mobile device associated with the user and transferred from the mobile device to the access point in order to transmit the secret, in particular if the time span between fingerprint capturing and presentation is below a certain threshold. Then, a processor associated with the interface of the access point may link the identity secret from the fingerprint to the location of the access point. The access point may further be connected to a communication network of the second party. In this manner, a large variety of authentication procedures may be established. In another embodiment, the access point may be associated with a door, a vehicle, or a machine. The access point may also be connected to internet of things (IoT) applications. In an embodiment, the access point is a point of sale (PoS) comprising the interface (to establish a physical contact with a token), the processor (to link the secret to a location information) and a terminal to establish a communication network with the second party. In another embodiment, the access point may comprise a processor and a receiver such that the access point is enabled to communicate, e.g. with a processing unit of the first party, via the token using a first communication channel. The access point may further be configured to be part of a second communication channel with a larger bandwidth than the first communication channel to enable communicate of larger data sets between the first party and the second party.

In the context of the present application, the term "physical contact" may refer to a coupling between the token and the access point, wherein token and access point are not separated by any distance or only separated by a very small distance (i.e. the token being in the proximity of the access point). In an embodiment, a physical contact means touching. In another embodiment, a physical contact means reading a barcode/QR-code using an optical scanner. In a further embodiment, a physical contact means a contact using a contact or contact-less smart card. In the latter case, for example, an NFC interface may be used which is limited to short distances. In an embodiment, the distance between token and access point is 20 cm or less, in particular 10 cm or less, more in particular 5 cm or less, in order to establish the physical contact.

In the context of the present application, the term "party" may refer to any entity that may establish a mutual agreement with another party. Hereby, at least a first party is associated with a mobile entity, or is the mobile entity, such that there is no location information related to the first party, if not a coupling with an access point is performed. In a basic embodiment, the first party may be a user that wants to perform a transacting related to a second party. For example, the first party may be a customer and the second party may be a vendor. The first party may be a single user, a group of people, or a company. The same holds true for the second party. The second party may also be a facility that already comprises a location-related information.

In the context of the present application, the term "authentication token" may refer to a piece of software (or hardware in a very specific embodiment) that comprises two information: one related to the identity of a first party, and the other one related to the location of the first party. The identity may be derived from a secret as described above, while the location may be derived from a physical coupling with an access point, as described above. The combined information in form of the authentication token may be used to establish a mutual agreement between the first party and the second party.

According to an exemplary embodiment, the invention may be based on the idea that an identity- and location-referenced agreement to a transaction is provided by physically coupling (e.g. touching) a location-referenced access point with a suitable token that is coupled to an identity-related secret. In this manner, a location reference is added to a mobile entity (such as a communication device, a human, or both) that is, due to its mobile nature, not location referenced. The authentication method as disclosed here may enable new business models where a first party (such as a customer) may request location- and identity-related services and/or goods. By providing an identity related information combined with a location related information (in an authorization token), a robust, secure, and easy implementable method is provided for authenticating a party with a mobile entity to another party, and to thereby establish a mutual agreement between the two parties.

In the following, further exemplary embodiments of the method and the communication system will be explained.

According to an exemplary embodiment, at least a part of the mobile entity has a processing unit coupled to the token, and the coupling further comprises: establishing a first communication channel between the first party and the second party via the token, the processing unit, and the access point. This may provide the advantage that an efficient and robust communication channel is provided that enables at the same time the transfer of identity-related information and location-related information.

The token and the processing unit may be directly connected, for example both embedded in a mobile phone, or indirectly connected, for example when the token is a finger of a human and the processing unit is embedded in a smart card or wristwatch (carried by the human). In other words, a location-referenced out-band channel may be utilized to exchange credentials for setting up a single-sign-on secure connection.

According to a further exemplary embodiment, the first communication channel comprises one of the group consisting of a galvanic interface, an electrical interface, an electromagnetic interface, an acoustic interface, and an optical interface. This may provide the advantage that the communication channel can be established in a feasible and cost-efficient manner.

A galvanic coupling may be realized by a finger of a human that touches a conductive surface at an interface of the access point. Thereby, a low-bandwidth first communication channel with a location-referenced information can be established such that a small number of bits may be transferred between the processing unit and the access point. The access point may hereby be communicatively connected to a network of the second party (e.g. using a terminal of the access point) so that an exchange of keys (e.g. session key) or PIN codes is enabled. For example, the secret and the location information (as an authentication token) may be transferred via the first communication channel to an authentication unit of the second party. After receiving the authentication token, the second party may send a session key (and/or PIN code) via the first communication channel to the processing unit of the first party.

An electromagnetic coupling may be realized using radio frequency, when used in a very short distance. For example, the NFC standard (limited to around 10 cm in distance) may be advantageously applied. In this embodiment, the token and the processing unit may be embedded in one and the same mobile device, for example the token may be an NFC interface that can be physically coupled (via the NFC connection) to the access point, while the processing unit establishes the first communication channel through the NFC interface to the second party.

An acoustic coupling may for example be realized using an access point with a microphone and a token configured as a loudspeaker that produces a specific acoustic signal. Acoustic coupling may be done as well using ultra-sonic.

An optical coupling may for example be realized with a barcode or a QR-code being the secret that is displayed using the token being configured as an optical display. The access point may comprise an optical scanner and the first communication channel may be established after scanning the barcode or QR-code.

According to a further exemplary embodiment, the secret is a credential of the group consisting of a PIN code and a biometric, in particular a fingerprint or a heart rate. This may provide the advantage that an easily obtainable but at the same time very robust identity-indicative secret can be used.

The PIN code may be a PIN code (e.g. 4-digit code, 6-digit code or n-digit code) from the first party. The secret may be a PIN code individually provided by the second party to the first party. The secret may also be a PIN code individually provided from a third party, e.g. one being accepted as an independent and neutral authority by both parties. An adaptive authentication may be enabled using the secret. When being a biometric (or a template thereof), the secret may relate to fingerprint, heart rate, iris, retina, hand vein, or handwriting.

According to a further exemplary embodiment, the method further comprises receiving a session key from the second party via the first communication channel at the processing unit in return to providing the authentication token, in particular wherein the validity of the session key is time-limited. This may provide the advantage that a mutual agreement between two parties can be efficiently established in a very secure manner.

As has already been described above, the first communication channel may be a channel with a low bandwidth, for example established through a galvanic or capacitive coupling between the finger of the human and the access point, and only very small data packages may be transferred. Hereby, a session key from the second party may be provided through the first communication channel, which session key can be used by the processing unit of the first party, to perform further authentication procedures.

In an embodiment, a maximum age of capturing an authentication credential, such as the session key, defined by the difference in time between the date of capturing the authentication credential and the time the second party requests the first party to provide authentication credentials, may for example comprise 60 seconds, 1 hour, 24 hours, 1 week, 1 month or 1 year.

In another embodiment, a maximum age of last enrolment, defined by the difference in time between the date of storing an authentication credential meant as authentication reference and the time the second party requests the first party to provide authentication credentials, may for example comprise 60 seconds, 1 hour, 24 hours, 1 week, 1 month or 1 year.

The second party may request one or more suitable authentication methods, a minimum authentication age, and/or a minimum enrolment age. The first party may request recapture of authentication credentials if the authentication age is too old, i.e. expired.

In one embodiment, the second party may cancel the transaction if the enrolment age does not match predefined requirements. Furthermore, the second party may provide a message to the first party to facilitate re-enrolment for a dedicated credential type.

According to a further exemplary embodiment, the method further comprises: establishing a second communication channel between the first party and the second party, wherein a bandwidth of the second communication channel is larger than the bandwidth of the first communication channel. This may provide the advantage that a channel with the large bandwidth, that can transfer large data packages, and that is normally not location referenced, can be established in an efficient and location-referenced manner.

The second communication channel may for example be one of WiFi, BLE (Bluetooth Low Energy), mobile LAN. While the transfer of the secret (credential) and the provision of a session key may be realized by the first communication channel, or other communication between the first and second party may be via the second communication channel. The second communication channel may be established through the access point or without the access point. In the latter case, the second communication channel does not have a location reference. This is however not necessary, because the location information has already been obtained by establishing the first communication channel. The second communication channel may serve for transferring larger data packages or the requested service. One party may indicate through the second communication channel which credential type may be supported by said party. In one embodiment, the second party may indicate a transaction insurance fee that may be added if the authentication methods supported by the first party may not fully meet the second party security requirements.

According to an exemplary embodiment, a convenient low-bandwidth first communication channel may establish a single-sign-on location-referenced and secure communication link on a non-location-referenced high-bandwidth second communication channel that may be for example a WiFi connection.

According to a further exemplary embodiment, after authenticating, a transaction between the first party and the second party is enabled through the second communication channel, in particular wherein the transaction is one of the group consisting of reception of goods or services for payment, access to a facility, access to one of a vehicle, a vessel, an apartment, and a home. This may provide the advantage that a secure channel with a sufficient bandwidth can be used to transfer all necessary data.

In a further embodiment, the second communication channel may be used such that the first party may also request a certificate, e.g. an identity authentication token, from the second party. For example, the first party, e.g. a user, may apply the second communication channel to transfer a request for authentication to the second party.

Then, the second party, e.g. a facility, may send an authentication token, e.g. a second identity token, through the second communication channel in order to authenticate itself to the first party.

According to a further exemplary embodiment, the processing unit, in particular also the token, is embedded in a mobile device, in particular one of the group consisting of a wristwatch, a wristband, a mobile phone, a smart card, a breast-band, a body area network. This may provide the advantage that the processing unit is already embedded in a device that is carried by a user associated with the first party.

In a preferred embodiment the processing unit may be established in a wristband and the token may be the finger of the user. Hereby, a contact may be established between the finger and the access point, such that the processing unit may be used to transfer the secret through the finger to the access point. In another embodiment the token is also embedded in the mobile device, for example, the token may be the metal frame of a mobile phone. In this manner, the frame may touch the access point and then the first communication channel may be established from the processing unit through the frame to the access point. In another embodiment, the token may be a contact or contact-less interface, e.g. of a smart card.

In case that the token is part of a mobile device, coupling between the token and the access point may comprise one of the group consisting of an ISO 7816 contact interface, an ISO 14443 contactless interface, an NFC interface, a USB interface, an SPI interface, an audio interface, a direct coupled connection, and an optical interface.

According to a further exemplary embodiment, the token is a finger of a human, in particular wherein coupling comprises a galvanic or capacitive coupling between the finger and the access point. May provide the advantage, that the described method may be realized in the very cost-efficient manner without additional efforts.

According to a further exemplary embodiment, the processing unit is embedded in a mobile device carried by the human. This may provide the advantage, that the mobile device is already associated and location-referenced with respect to the first party.

According to a further exemplary embodiment, the secret comprises a first credential and a second credential, in particular wherein the first credential is more secure than the second credential. This may provide the advantage that the method is even more secure, because different levels of security may be established.

For example, the secret may comprise the credentials fingerprint and heart rate. The secret may also comprise a PIN code as one credential and a biometric as the other credential. One of these credential may have a very short time limit and the other one may have a longer time limit. By making one credential more secure (i.e. more difficult to discover) than the other, different levels of security may be established and the method as a whole may be made more flexible.

According to a further exemplary embodiment, the secret is obtained from a body area network. This may provide the advantage that the secret can be directly obtained from measurements done by the body area network.

A body area network may comprise one or more mobile device associated with a (human) body. For example, a mobile phone and a wristwatch may form a body area network, wherein e.g. the wristwatch measures the heart rate and transfers the result to the mobile phone.

According to a further exemplary embodiment, the second party comprises a second party token, in particular wherein the second party token is indicative for the identity and the location of the second party, wherein authenticating further comprises comparing the first party token with the second party token.

According to a further exemplary embodiment, the access point is at least a part of a point of sale, and wherein authenticating further comprises establishing a remote communication between the access point and a communication network of the second party. This may provide the advantage, that the access point is a neutral (third) party with a fixed location that can communicate with other entities of the second party in an efficient and flexible manner even over large distances.

According to a further exemplary embodiment, the access point comprises an interface, in particular configured as a button, in particular a button comprising a sensor, the processor, and a terminal configured to establish a remote communication between the access point and a communication network of the second party. This may provide the advantage, that the access points is realized in a feasible and cost-efficient manner.

The button may be configured as a conductive plate that may establish an electric contact. Furthermore, the button may comprises a sensor for sensing the secret, for example a fingerprint sensor or a heart rate sensor. This information may be used in addition to an identity secret provided through the mobile device.

The aspects defined above and further aspects of the invention are apparent from the examples of embodiment to be described hereinafter and are explained with reference to these examples of embodiment. The invention will be described in more detail hereinafter with reference to examples of embodiment but to which the invention is not limited.

BRIEF DESCRIPTION OF THE DRAWINGS

FIGS. 3a illustrates a transaction protocol according to the prior art and 3b illustrates a transaction protocols using a token according to an embodiment of the invention.

FIG. 4 illustrates a communication system according to an exemplary embodiment of the invention.

FIGS. 5a and 5b illustrate a mobile device with a processing unit according to exemplary embodiments of the invention.

The illustrations in the drawings are schematic. In different drawings, similar or identical elements are provided with the same reference signs.

DESCRIPTION OF EMBODIMENTS

Figure 1:
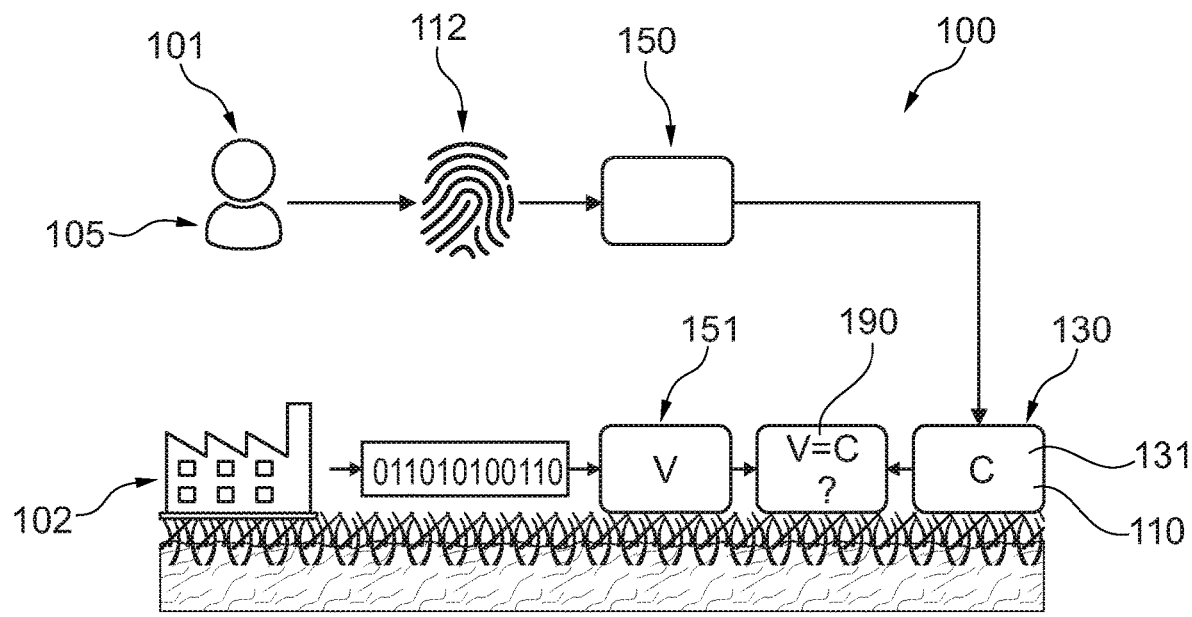
FIG. 1 illustrates a communication system according to an exemplary embodiment of the invention.

Before, referring to the drawings, exemplary embodiments will be described in further detail, some basic considerations will be summarized based on which exemplary embodiments of the invention have been developed.

According to an exemplary embodiment of the invention, the invention relates to tokens enabling individual authenticated access to transactions and services, facilities, vehicles, vessels, apartments, homes, personal information like passport data, health data, and breeder data.

According to an exemplary embodiment, the inventive idea may be described as follows. If a transaction requires for legal or security reasons provision of a consent, while being physically present, these transactions must not be executed by mobile devices connecting by a communication link that does not allow a detailed location of all parties being involved in the transaction. Normally, in case of two parties being involved, one party may be a fixed-installed coupling point like e.g. a smartcard reader. Looking at access control, one party may be a reading device next to a bar. Prior art comprises smartcards being coupled to a location-referenced smartcard reader and thus providing an act of consent by physically coupling the smartcard with the smartcard reader. Another example is coupling an NFC-equipped device with a location-referenced NFC reading device. For secure and convenient transaction authentication, biometric credentials have become very popular. Equipping smartcards with biometric authentication methods is challenging as the form factor of smartcards conflicts with power requirements, mechanical endurance requirements or simply cost. Utilizing current mobile devices for biometric authentication is challenging as these devices are not equipped for secure biometric authentication combined with location-referenced physical coupling to a host in a convenient manor. It is a desire of this document to provide a general scheme for authentication with physical location reference. A two-step approach is utilized, wherein a first step provides physical-location reference and also provides credentials to access a non-location referenced communication channel for execution of the transaction, thus making the non-location referenced communication channel location referenced.

According to an exemplary embodiment, for an improved user experience, adaptive security levels are supported by e.g. accepting for lower-value transaction that an acceptable time may have elapsed between capturing of authentication credentials and provision of authentication credentials. In an example, a token holder may authenticate towards his biometric token once a month and may provide the biometric credentials to a public transportation system during a whole month.

According to an exemplary embodiment, a battery-supplied security client token may be equipped with a first and a second communication channel configured to communicate with a secure execution environment on a host system.

According to an exemplary embodiment, the first communication channel may be configured to provide location-reference at the penalty of reduced bandwidth, while the second communication channel may be configured to provide high bandwidth at the penalty of lacking location reference. The first communication channel may be configured to exchange credentials required to establish a single-sign-on secure communication utilizing the second communication channel, thus linking communication through the second communication channel to an established communication through the first communication channel. As communication through the first communication channel requires location-reference, communication through the second communication channel may be regarded being location-referenced as well. By doing so, communication channels that by nature may not be location-referenced may be made location-referenced. As one example, a mobile device providing such second communication channel may be made a single-sign-on and location-referenced communication channel by adding a first communication channel providing single-sign-on credentials and being location referenced.

According to an exemplary embodiment, a purpose of the method is to execute transactions requiring location reference through a communication channel that by nature may not be location-referenced. A key element of the described method is to model the mutual agreement between two parties, that forms the base of any transaction. The solution described here replaces the process of mutual eye-witnessing by separating the process in time into the steps of i) coupling the token of each party to their identity and ii) coupling the tokens of both parties at the physical location of the transaction. By doing so, the two parties may still be mutually coupled to each other at the location of the transaction.

According to an exemplary embodiment, eye-witnessing is one way to couple the identities of the parties to a physical location. Another way may involve a third party (see e.g. FIG. 2 below): i) a third party being accepted as an independent and neutral authority by a first and a second parties eye-witnesses the identity of the first party and creates at the moment of witnessing a secret being indicative for the first party, and ii) coupling the token of the first party to its identity by storing the secret created in the previous step securely on an authentication token. These steps may be repeated for the second party.

According to an exemplary embodiment, the second party may request at least one authentication credential, wherein the authentication credentials may be biometric credentials that verify a person's identity. The combination of a location-referenced communication channel and a biometric credential may provide location- and identity-referenced authentication.

According to an exemplary embodiment, the method disclosed utilizes a convenient out-of-band body area network communication to establish a single-sign-on location referenced and secure communication link on a non-location-referenced high-bandwidth communication channel that may be a WiFi connection, referred to as the second communication channel.

According to an exemplary embodiment, the authentication method as disclosed here may enable new business models where a customer my request location- and identity-related services and goods. Utilizing a body area network will make authentication very convenient, as just a finger touch on a body area network access point is required if e.g. heart rate is utilized as one authentication credential.

According to an exemplary embodiment, the method may provide the following advantages: supports enrolment of multiple credentials, supports combination of different credentials for increased security levels, communication between host terminal and an individual established by body area network, adaptive utilization of pre-recorded or real-time authentication credentials to satisfy security and convenience requirements, bootstrapping by utilizing a convenient body area network to provide location reference and to provide single-sign-on credentials.

According to an exemplary embodiment, an established secure and high bandwidth single-sign-on connection for execution of transaction, including authentication, supports authentication of payments or access to facilities, services, devices, vehicle, vessels, homes, apartment, provides easy access to information related to the individual like personal data and health data.

According to an exemplary embodiment, coupling of the token at the physical location of the transaction (i.e. location-referenced) must maintain integrity of the communication channel. So far, the following methods described by prior art and fulfilling the requirements of coupling a token of one party with a token reader being coupled to the secure execution environment of the other party at one physical location have been applied: i) payment card reading according to ISO 7816 or ISO 14443 or NFC, ii) insertion of a key into a door lock, and iii) provision of an optical one-time token to a token reader at the entrance of an event facility.

According to an exemplary embodiment, a token of one party that is communicating by a method that does not provide location reference is not suited to execute a secure transaction with the other party if coupling at the physical location of the transaction is a prerequisite for transaction execution. This may apply if one party may request access to a facility owned by the other party. In this application case, it must be safeguarded that only authorized individuals may access the facility. This may require provision of biometric authentication credentials or eye-witnessing. Unsuitable communication methods may comprise e.g. mobile communication channels, WiFi, BLE, RF radio channel. Suitable communication methods may comprise: ISO 7816 contact interface, ISO 14443 contactless interface, NFC interface, USB Interface, SPI Interface, audio interface, direct coupled connection.

According to an exemplary embodiment, the execution of a transaction involving authentication shall be made as convenient as possible for individuals, while still providing the security level required for the involved parties. The two parties involved in a typical transaction may be i) the party receiving goods or services (the customer), ii) the party receiving compensation for delivery of goods or services (the vendor). Convenience from customer perspective shall mean: simple interaction with vendor without a need for complex means, intuitive coupling method. Convenience from vendor perspective shall mean: fast interaction with customer, fully automated execution of transaction (no human labor effort required). Security from customer perspective shall mean: secure handling of customer's credentials by vendor, verified link of vendor's identity to vendor's token, customer has eye-witnessed the physical location of the vendor's token or token-reader. Security from vendor's perspective shall mean verified link of vendor's identity to vendor's token, verified presence of customer's token at required physical location.

According to an exemplary embodiment, the method emulates the behavior of an identity sensitive button to fulfill both party's convenience and security requirements. In more detail (see e.g. FIG. 12 below), this may comprise the following: i) let the customer's token be a secure element configured to decrypt, encrypt and store certificates and to execute a computer program fulfilling previously mentioned tasks, ii) let the vendor's token be a server-based secure execution environment configured to decrypt, encrypt and store certificates, to execute a computer program fulfilling previously mentioned tasks, iii) link the customer's token to an identity related to a customer's biometric, e.g. a fingerprint reference template, a secret provided by the vendor to the customer, e.g. a PIN code, a secret provided by an authenticated third party to the customer, e.g. a PIN code, any other suitable secret being accepted by the vendor, iv) link the vendor's token to an identity related to a registered identity, e.g. a company registered at a registered location in an official register (trade register), a secret provided by an authenticated third party to the customer, e.g. a certificate, a physical unclonable function linked to a location-referenced token, any other suitable secret being accepted by the vendor. Upon execution of a transaction: i) the vendor may provide quote, terms & conditions communicated to the customer in suitable electronic format or in non-electronic format, ii) the customer may accept the offer/quote/terms and conditions by deliberately coupling his token containing a secure element by suitable means with an access point connected to the vendor's token and thus establishing a first communication channel at the physical location of the transaction. The customer may indicate to the vendor through the first communication channel his favorized second communication channel type, iii) in turn, the vendor may provide credentials to the customer that enables single-sign-on access to a second communication channel in encrypted manor—all future communication is through this secure second communication channel, iv) the transaction may be executed following standard transaction flow (e.g. following an MChip applet payment flow) utilizing the secure second communication channel, wherein the vendor's token may request authentication credentials of a certain authentication type (e.g. a fingerprint template), v) the customer's secure element may check whether it has the required authentication credentials and may return the credentials through the second communication channel the vendor's token for authentication, vi) the customer's secure element may check whether it has the required authentication credentials and may request capturing new credentials if the validity of existing credential does not match the vendor's requirements. Capturing of new credentials may comprise e.g. capturing a time series of biometric data and translating that into a feature template, capturing a PIN code. When the newly captured credentials are available they may be returned to the vendor. Upon successful authentication, the vendor may execute a financial transaction or grant the customer access to a facility, a vehicle or a service. Upon repeated unsuccessful authentication, the vendor may respond by requesting a secondary credential of a different type which may e.g. be a PIN code. The vendor may repeat requesting other secondary credential types until all options have been tried, in which case the transaction may be canceled by the vendor.

According to an exemplary embodiment, the token may be utilized to authenticate by a heart rate credential towards a door lock by simply touching the door lock to get authenticated access to a room.

According to an exemplary embodiment, the first communication channel between a vendor terminal and a customer may be established by a body area network, wherein the customer is required to make physical contact with a location-referenced access point by a capacitive coupled payload-modulated electrical carrier signal, by a galvanic contact payload-modulated electrical carrier signal, by an acoustically coupled payload-modulated ultrasonic carrier signal, by a dynamically generated optical secret being displayed at the location of the transaction on a display controlled by the vendor an being received by an optical sensor converting said secret into a machine-readable secret being provided to the customer. In this setup, the customer may not chose a preferred primary communication channel and instead is obliged to utilize a channel as indicated by the vendor.

According to an exemplary embodiment, an employee may be requesting access to a facility. The facility (as the second party) creates a one-time-secret (e.g. a session key) that is sent to the employee (through a first communication channel). The employee may provide the one-time-secret to the facility by touching an access-point, thus enabling a secure second communication channel. The facility may request the employee's authentication credentials. Furthermore, it may ask the employee to accept e.g. the new safety regulations. Only upon acceptance of the new safety regulations access to the facility may be granted.

According to an exemplary embodiment, the symmetric version may also apply: a facility sends a one-time password to a user through a first communication channel being bandwidth restricted and user-created from the one-time password and a secret stored by token and being indicative for the user's identity. In this manner, a new certificate is returned through the second communication channel to the facility.

According to an exemplary embodiment, a tourist may board an airplane. At his seat, he may scan an optically encoded certificate being attached to the seat and clearly identifying the seat by an optical sensor being contained in a mobile phone converting the optically encoded certificate into a machine-readable format. The certificate may provide access credentials to establish a secure connection though e.g. a WiFi connection. Upon connection establishment, the airplane may request the tourist to provide authentication credentials. The tourist may now start shopping on the plane's shopping portal by adding item to a shopping cart. Upon check-out, the airplane server may provide a session key that the tourist is requested to send back through the access point to the airplane server, thus providing an act of consent. Depending on the transaction volume, the airline server may request additional authentication credentials, where specifically a heart rate credential may be convenient as it may have captured immediately.

According to an exemplary embodiment, a user may be requested to provide his credentials to log into a PC. The user may touch a coupling part of the PC to provide his credentials to gain access to the PC account.

According to an exemplary embodiment, the first party is a person needing medical help, the second party is a first-responder-rescuer. The rescuer may touch the person with an access point attached to an integrated device, establish a second secure communication channel and requesting personal data like name, address, age, blood-type, allergies, or whatever is required to provide first aid.

FIG. 1 illustrates an exemplary embodiment of a communication system 100. The communication system 100 comprises a token 150 (in the example shown, the finger of a human), wherein the token 150 is a part of a mobile entity 105 (in the example shown a human). The mobile entity 105 is in this example also the first party 101, i.e. a user/customer. The token 150 is coupled to a secret 112 being indicative for the identity of a first party 101. In the present example, the secret 112 is the fingerprint of the human and thereby directly coupled to the token 150 (being the finger).

The communication system 100 further comprises an access point 130, configured to be coupleable to the token 150 by establishing a physical contact. The physical contact can be established, when the finger touches a button (being an interface) of the access point 130. The button of the access point 130 comprises a fingerprint sensor such that the secret 112 (the fingerprint) can be directly transferred to the access point 130. Herefore, the access point 130 is coupled to a processor 131. The access point 130 is directly associated with the second party 102 and comprises the button with the fingerprint sensor and the processor 131. The processor 131 is configured to link the identity secret 112 with a location information of the access point 130, thereby providing an authentication token 110 being indicative for the identity and the location of the first party 101.

The communication system 100 further comprises an authentication unit 190 of the second party 102, configured to authorize the first party 101 by receiving the authentication token 110. In FIG. 1, the authorization token 110 of the first party 101 is indicated by a C (customer) and a second party token 151 of the second party 102 is indicated by a V (vendor). The second party 102 is a facility and the first party 101 is a user that wants to perform a transaction. The second party 102 provides a bit code that includes the second party token 102. In order to finish the authorization process, the authentication unit 190 compares the authentication token C of the first party 101 with the second party token V and, in case of matching, authorizes the first party 101 to perform the transaction with the second party 102.

Figure 2:
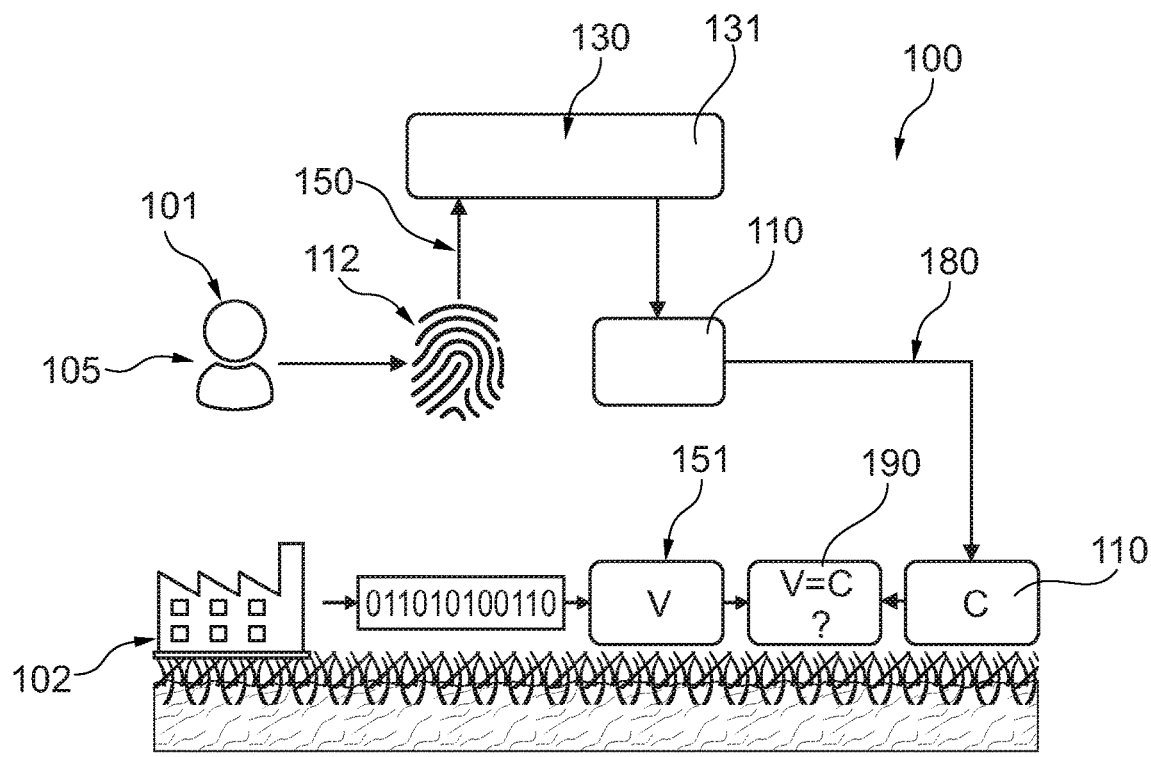
FIG. 2 illustrates a communication system according to a further exemplary embodiment of the invention.

FIG. 2 illustrates a further exemplary embodiment of the communication system 100. This example is very similar to the one shown in FIG. 1, however, the access point 130 is not associated with the second party 102 but is instead a neutral entity (third party) accepted by the first party 101 and the second party 102. The access point 130 is configured as a stationary point of sale at a defined location. The access point 130 comprises an interface with a sensor, such that the secret 112 from the first party 101 can be transferred. The access point 130 furthermore comprises a processor 131 to link the identity secret 112 to the location of the access point 130. The combined information, the authentication token 110, is then sent to the authentication unit 190 associated with the second party 102. As the point of sale is at a neutral location remote from the facility of the second party 102, sending is done via a communication network 180 connection of the second party 102.

FIG. 3a shows a prior art example of steps that are performed during an authentication procedure before starting a transaction. This includes the steps: i) request for quotation, ii) reception of quote, iii) acceptance of quote, iv) mutual agreement (terms and conditions), v) thoughtful act of consent and signing a contract, and vi) exchanging deliverables.

FIG. 3b shows a more efficient authentication procedure, wherein the steps of acceptance of quote, mutual agreement (terms and conditions), thoughtful act of consent and signing a contract, and exchanging deliverables/providing payment, are combined into a token-based payment procedure. The token can enable individual authenticated access to transactions and services, facilities, vehicles, vessels, apartments, homes, personal information like passport data, health data, breeder data.

FIG. 4 illustrates a basic exemplary embodiment of a communication system 100, very similar to the one described for FIGS. 1 and 2. The first party 101 is a user which is at the same time the mobile entity 105 and his or her finger is used as the token 150 that is coupled to an identity secret 112, i.e. the fingerprint. The finger touches a button (which comprises a fingerprint sensor) of an access point 130, thereby providing location-referenced information in addition to the identity information from the secret 112.

FIG. 5a illustrates a mobile device 106 with a processing unit 115 according to exemplary embodiment. The mobile device 106 is hereby a wristwatch carried by a human. The human is at the same time the first party 101 and the mobile entity 105. The mobile device 106 carried by the human is thereby also part of the mobile entity 105. The processing unit 115 can be configured to establish a first communication channel. The token 150 is separate from the mobile device 106, because the token 150 is the finger of the human.

FIG. 5b illustrates another embodiment of the mobile device. The token 150 is now arranged at or in the mobile device 106. The token 150 is configured as a part of the wristwatch, e.g. as an NFC or optical interface.

FIGS. 6 to 11 illustrate methods of authentication using a communication system 100 according to exemplary embodiments of the invention.

Figure 6:
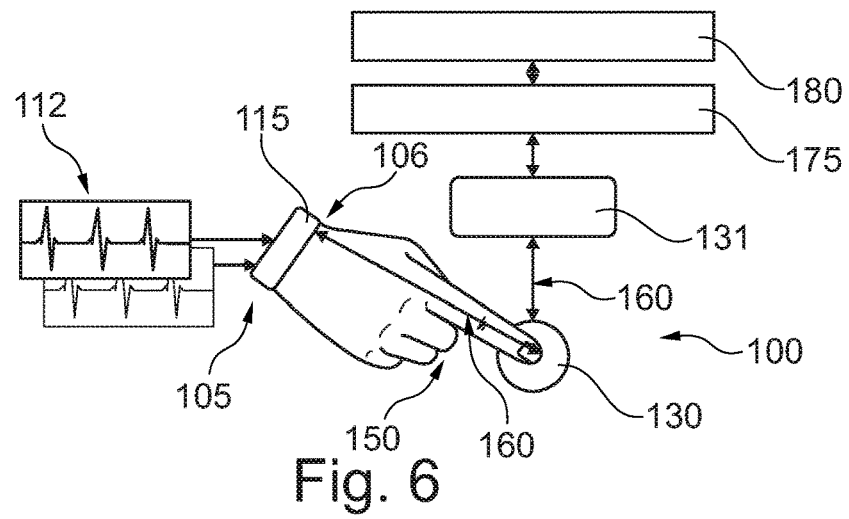
FIGS. 6 to 11 illustrate methods of authentication according to exemplary embodiments of the invention.

FIG. 6: The mobile entity 105 is a human that carries a mobile device 106 being a wristwatch. The wristwatch comprises a processing unit 115 that is coupled to a token 150. In the example shown, the token 150 is the finger of the human that carries the wristwatch 106 with the processing unit 115. An access point 130 comprises a conductive button such that a galvanic or capacitive coupling (physical contact) is established, when the finger 150 touches the interface of the access point 130. Upon establishing the physical contact, a first communication channel 160 between the first party 101 (customer) and a second party 102 (vendor) via the token 150, the processing unit 115, and the access point 130 can be set up. The secret 112 is a biometric, in particular a heart rate, of the human. The wristwatch 106 is part of a body area network and senses the heart rate directly at the wrist. The measured heart rate is then transferred by the processing unit 115 through the first communication channel 160 (in an example via the token 150) to the access point 130. The first communication channel 160 has a very low bandwidth and only very short bit codes can be transferred to the access point 130. The access point 130 is configured as a point of sale and comprises a processor 131. The processor 131 is also part of the first communication channel 160 and receives the identity secret 112 (heart rate) from the first party 101 and adds a location information in order to obtain an authentication token 110.

Alternatively, the secret 112 comprises more than one biometric credential, e.g. a heart rate and a fingerprint. Furthermore, the secret 112 can comprise a PIN code or a PIN code and a biometric. The processor 131 can also be at least part of an ISO 7816 (contact) interface that directly interacts e.g. with a token 150 embedded in a smart card. The first communication channel 160 can be established, besides a galvanic interface, also e.g. by an electrical interface, an electromagnetic interface, an acoustic interface, or an optical interface.

The access point 130 further comprises a terminal 175, e.g. a point of sale terminal. The terminal 175 connects the access point 130 to a communication network 180. In this manner, the information obtained through the first communication channel 160 (e.g. the authentication token 110) can be directly transferred to the second party 102. The first party 101 can then, in reply to sending the authentication token 110, receive a session key from the second party 102 via the first communication channel 160 at the processing unit 115. The session key can be used to finalize the authentication procedure. The validity of the session key is hereby time-limited to provide a high level of security.

As described, the token 150 may be utilized to authenticate a payment transaction by a heart rate credential 112 towards a payment network 180 in a tap-and-pay manor by simply touching the access point 130 by a finger, utilizing a pre-recorded heart rate time series as the secret 112. In an example, the token 150 is utilized to authenticate by a fingerprint credential, having a validity time of e.g. 1 minute, towards an IOT device offering a pay service.

Figure 7:
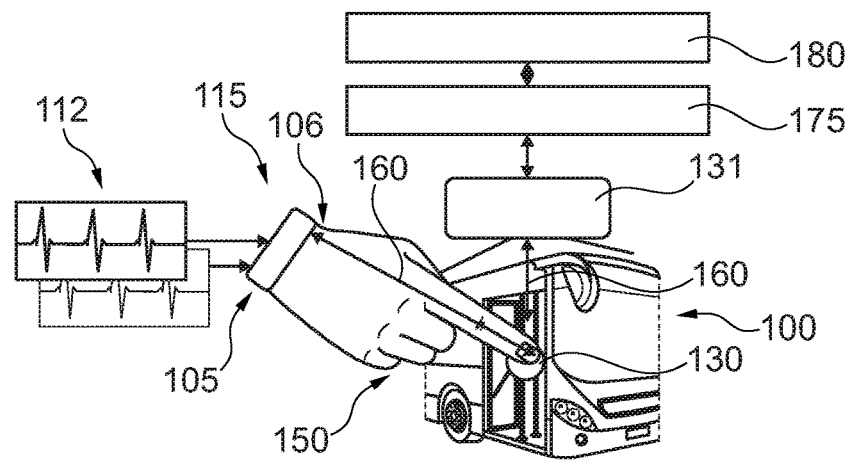

FIG. 7: In this exemplary embodiment, the token 150 is utilized to authenticate, by a heart rate and/or PIN code credential as the secret 112, having a validity period of e.g. one month, to a public transportation service (as the second party 102), wherein the user (first party 101) touches a conductive part (being an interface of the access point 130) of a vehicle offering a transportation service.

Figure 8:
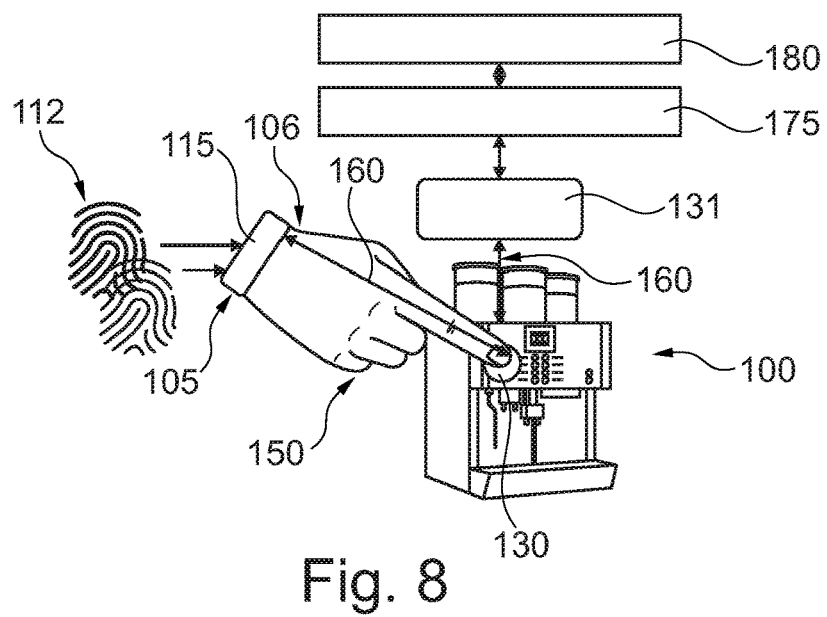

FIG. 8: In this exemplary embodiment, the token 150 is utilized to authenticate, by a fingerprint credential as the secret 112, to an IOT device being a coffee machine (second party 102) offering a pay service.

Figure 9:
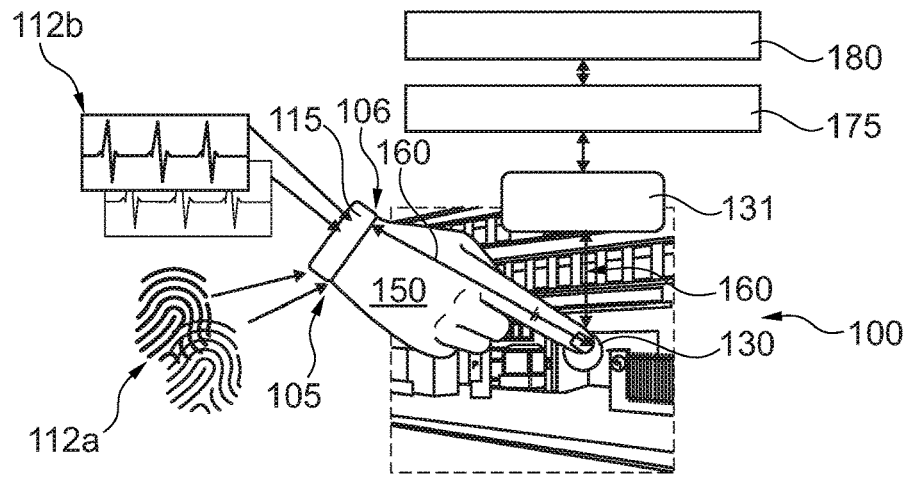

FIG. 9: In this exemplary embodiment, the token 150 is utilized to authenticate, by a credential combination of a fingerprint as a first credential 112a and a heart rate as a second credential 112b (together as the secret 112), to a gate (including the access point 130) at a facility to provide authenticated access to the facility (facility being the second party 102). Hereby, the second party 102 sequentially requests first a fingerprint credential 112a and secondly requests a heart rate credential 112b so that the overall security level is larger than the security level obtained from a single biometric.

Figure 10:
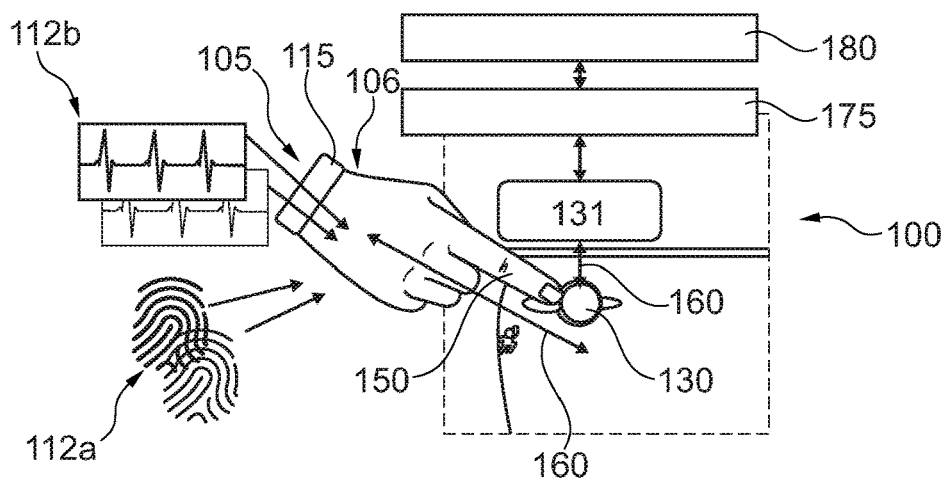

FIG. 10: In this exemplary embodiment, the token 150 is utilized to authenticate, by a combination two credentials, to a vehicle or vessel (of the second party 102) by simply touching the vehicle's or vessel's body (including the access point 130) to get authenticated access to said vehicle or vessel, wherein the first credential is e.g. a 6-digit PIN code with a validity period of 3 months and the second credential is e.g. a heart rate with a validity date of 2 weeks that may be re-enrolled by the customer himself, thus utilizing a very convenient and difficult to copy biometric as a first protection layer and a strong PIN code as a second protection layer.

Figure 11:
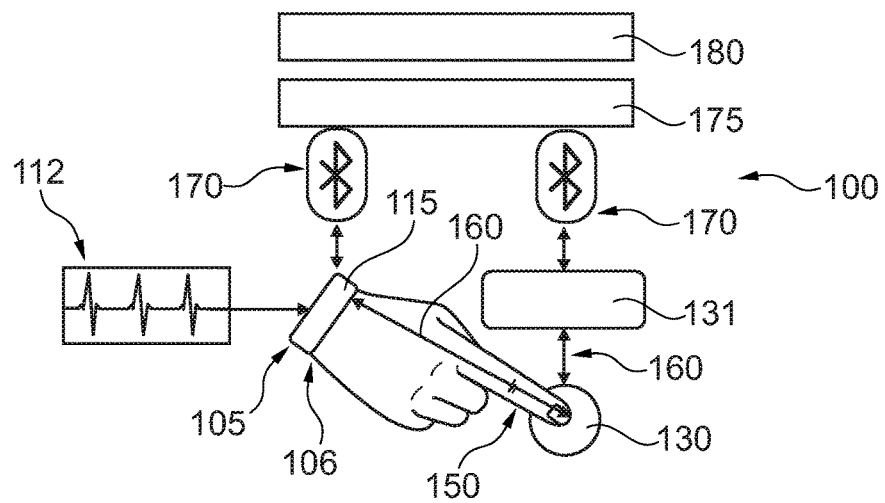

FIG. 11: In this exemplary embodiment, a second communication channel 170 is established between the first party 101 and the second party 102, wherein a bandwidth of the second communication channel 170 is larger than the bandwidth of the first communication channel 160. While the first communication channel 160 serves the purpose of transferring merely a small number of bits, e.g. a session key or a secret 112, the second communication channel 170 has a large bandwidth and enables the transfer of large data amounts. The second communication channel 170 is contact-less, in the example shown Bluetooth (BT) is used. The second communication channel 170 is established between the processor 131 of the access point 130, the terminal 175 of the access point 130 (being a point of sale) and via a communication network 180 to the second party 102. Furthermore, the second communication channel 170 is established between the second party 102 and via the terminal 175 of the access point 130 to the processing unit 115 of the first party 101.

After authenticating, e.g. using a session key provided by the second party 102 in return to transferring the authentication token 110 through the first communication channel 160, a transaction can be enabled between the first party 101 and the second party 102 through the second communication channel 170. The transaction is for example the reception of goods or services for payment, access to a facility, or access to one of a vehicle, a vessel, an apartment, and a home.

Figure 12:
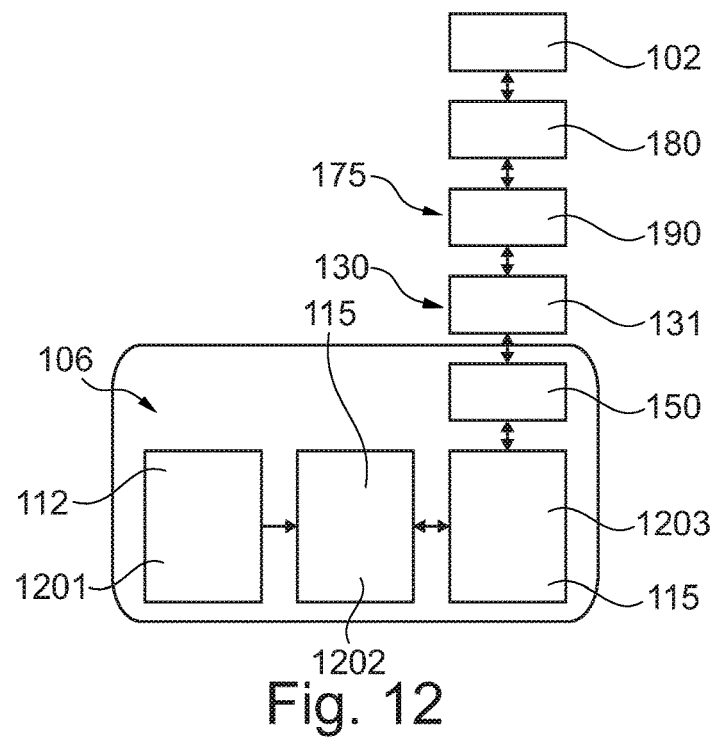
FIG. 12 illustrates a communication system with a smart card according to an exemplary embodiment of the invention.

FIG. 12 illustrates a communication system 100 with a mobile device 106 according to an exemplary embodiment of the invention. The mobile device 106 is configured as a smart card. The smart card 106 comprises a token 150 in the form of a contact or contact-less interface. The term "contact-less" refers, however, to a protocol such as NFC that is not used in a distance being larger than 10 cm. The smart card comprises a biometric sensor 1201 that captures a biometric secret 112, e.g. a fingerprint. The smart card further comprises a microcontroller 1202 that extracts a feature from the biometric and generates a template, e.g. a template of the fingerprint. Furthermore, the smart card comprises a secure element 1203 that provides the secret 112 to the token 115 and is further used for payment transaction and matching.

The smart card 106 establishes a physical contact (e.g. NFC) to an interface of an access point 130 so that the secret 112 can be transferred. The identity secret 112 is coupled to the location of the access point 130 (e.g. using a processor 131 of the access point) and is then transferred (as an authentication token 110) to an authentication unit 190 associated with the second party 102. Via a communication network 180, a second party token 151 can be provided from the second party 102, which is operated in a secure execution environment, and is then compared to the authentication token 110.

Figure 13:
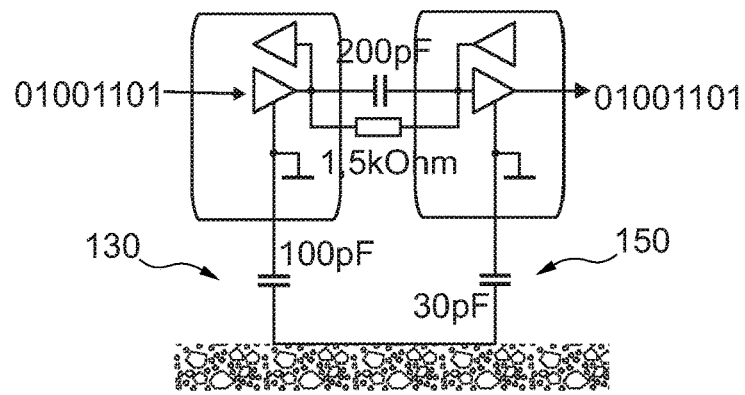
FIGS. 13 and 14 illustrate a physical contact between a token and an access point according to exemplary embodiments of the invention.
Figure 14:
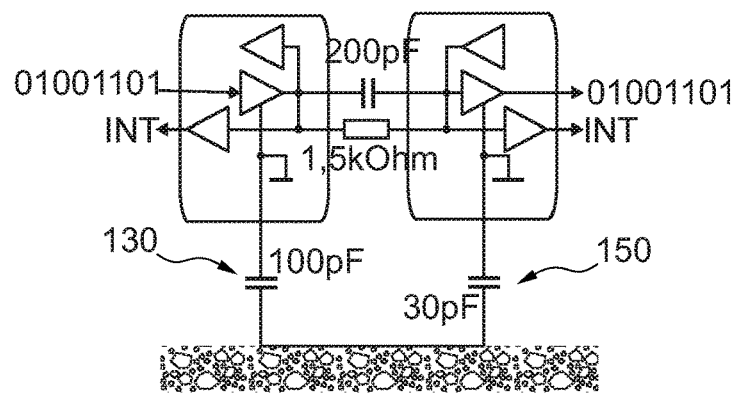

FIGS. 13 and 14 illustrate a physical contact between a token 150 and an access point 130 according to exemplary embodiments of the invention.

REFERENCE NUMERALS

100 Communication system
101 First party
102 Second party
105 Mobile entity/mobile device
106 Mobile device
110 Authentication token
112 Secret
112a First credential
112b Second credential
115 Processing unit
130 Access point
131 Processor
150 Token
160 First communication channel
170 Second communication channel
175 Terminal
180 Communication network
190 Authentication unit
1201 Biometric sensor
1202 Microcontroller
1203 Secure element

The invention claimed is:

1. A method for authenticating a customer to a vendor for a transaction involving goods or services, the method comprising:
providing a token, wherein the token is at least a part of a mobile entity, wherein the token is coupled to a secret being indicative for the identity of the customer, wherein at least a part of the mobile entity has a processing unit coupled to the token;
coupling the token with an access point by establishing a physical contact using a first communication channel between the token, the processing unit, and a point-of-sale terminal of the access point;
transferring the secret to the access point;
linking the secret with a location information of the access point, wherein an authentication token comprises the secret and the location information, the authentication token being indicative for the identity and the location of the customer;
providing the authentication token to the vendor using the first communication channel; and
establishing a second communication channel between the customer and the vendor via the processing unit of the mobile entity to a processor of the access point, from the processor of the access point to the point-of-sale terminal of the access point, and from the point-of-sale terminal of the access point to the vendor via a communication network, wherein the second communication channel is not location referenced and the second communication channel is for executing the transaction with the point-of-sale terminal after completing the location referenced authentication with the authentication token via the first communication channel, and wherein a bandwidth of the second communication channel is larger than a bandwidth of the first communication channel.

2. The method according to claim 1, wherein the first communication channel comprises one of the group consisting of a galvanic interface, an electrical interface, an electromagnetic interface, an acoustic interface, and an optical interface.

3. The method according to claim 1, wherein the secret is a credential of the group consisting of a PIN code and a biometric, in particular a fingerprint or a heart rate.

4. The method according to claim 1, further comprising:
receiving a session key from the vendor via the first communication channel at the processing unit in return to providing the authentication token, in particular wherein the validity of the session key is time-limited.

5. The method according to claim 1, wherein the transaction is one of the group consisting of reception of goods or services for payment, access to a facility, access to one of a vehicle, a vessel, an apartment, and a home.

6. The method according to claim 1, wherein the processing unit, in particular also the token, is embedded in a mobile device, in particular one of the group consisting of a wristwatch, a wristband, a mobile phone, a smart card, a breast-band, and a body area network.

7. The method according to claim 1, wherein the token is the finger of a human, in particular wherein coupling comprises a galvanic or capacitive coupling between the finger and the access point.

8. The method according to claim 7, wherein the processing unit is embedded in a mobile device carried by the human.

9. The method according to claims 1, wherein the secret comprises a first credential and a second credential, in particular wherein the first credential is more secure than the second credential.

10. The method according to claim 1, wherein the secret is obtained from a body area network.

11. The method according to claim 1, wherein the access point is at least a part of a point of sale, and the method further comprises:
establishing a remote communication between the access point and a network of the vendor.

12. A communication system, comprising:
a token, wherein the token is at least a part of a mobile entity, and wherein the token is coupled to a secret being indicative for the identity of a customer in a transaction for goods or services from a vendor, wherein at least a part of the mobile entity has a processing unit coupled to the token;
an access point, configured to be coupleable to the token by establishing a physical contact such that the secret can be transferred to the access point using a first communication channel between the token, the processing unit, and a point-of-sale terminal of the access point, wherein the access point is coupled to a processor, and wherein the processor is configured to link the secret with a location information of the access point, wherein an authentication token comprises the secret and the location information, the authentication token being indicative for the identity and the location of the customer;

an authentication unit of the vendor, configured to receive the authentication token via the first communication channel; and a second communication channel between the customer and the vendor via the processing unit of the mobile entity to a processor of the access point, from the processor of the access point to the point-of-sale terminal of the access point, and from the point-of sale terminal of the access point to the vendor via a communication network, wherein the second communication channel is not location referenced and the second communication channel is for executing the transaction with the point-of-sale terminal after completing the location referenced authentication with the authentication token via the first communication channel, and wherein a bandwidth of the second communication channel is larger than a bandwidth of the first communication channel.

13. The communication system according to claim 12, wherein the access point comprises an interface, in particular configured as a button, more in particular a button comprising a sensor, the processor, and a terminal configured to establish a remote communication between the access point and a communication network of the vendor.

* * * * *